No. 765,612. PATENTED JULY 19, 1904.
F. B. COREY.
SAFETY DEVICE.
APPLICATION FILED JAN. 2, 1904.
NO MODEL.
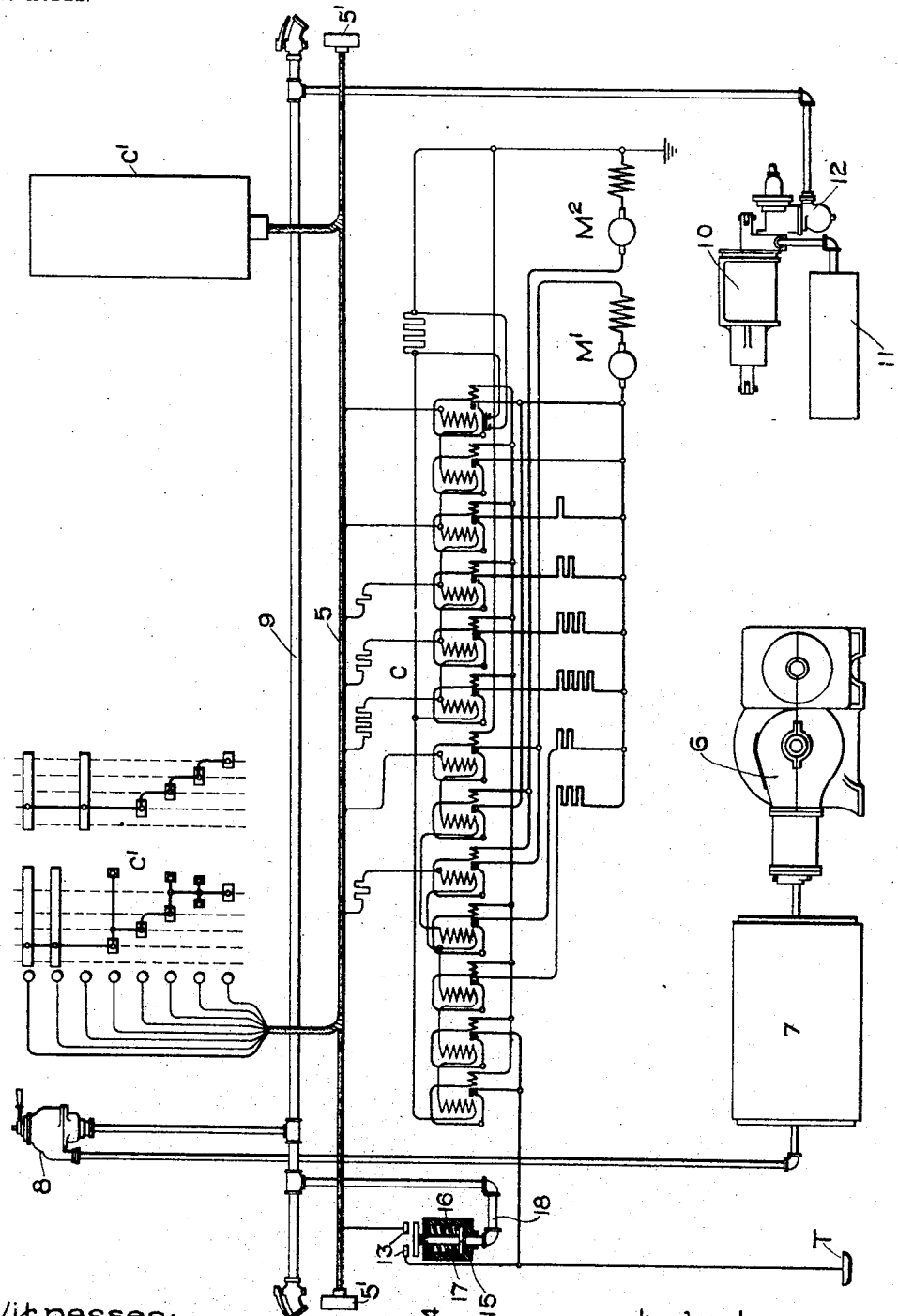
Witnesses:
Irving E. Stearns.
Benjamin B. Hull.
Inventor,
Fred B. Corey.
by Albert N. Davis
Att'y.

No. 765,612. Patented July 19, 1904.

UNITED STATES PATENT OFFICE.

FRED B. COREY, OF SCHENECTADY, NEW YORK, ASSIGNOR TO GENERAL ELECTRIC COMPANY, A CORPORATION OF NEW YORK.

SAFETY DEVICE.

SPECIFICATION forming part of Letters Patent No. 765,612, dated July 19, 1904.

Application filed January 2, 1904. Serial No. 187,446. (No model.)

*To all whom it may concern:*

Be it known that I, FRED B. COREY, a citizen of the United States, residing at Schenectady, county of Schenectady, State of New York, have invented certain new and useful Improvements in Safety Devices, of which the following is a specification.

My invention relates to a safety device adapted for use in connection with a system of motor control operated in conjunction with a braking system.

The invention is more particularly adapted for use in connection with systems of train control as applied to an electrically-propelled vehicle or vehicles employing a braking system operated by compressed fluid.

In order to insure the stopping of an electrically-propelled train or vehicle in the shortest possible time in case of an emergency, it has heretofore been suggested to interrupt the motor circuit or circuits in a system of train control when the pressure rises in the brake cylinder or cylinders as the brakes are applied, so that even if the operator fails to open the circuit of the propelling-motors before attempting to apply the brakes the circuit will be automatically opened upon application of the brakes. In a system of this kind there is a possibility of accident on account of the fact that the brakes must be released before the circuit can be reëstablished, thereby permitting a train stopped on an upgrade to run backward before power can be applied.

One of the objects of my present invention is to overcome the above-mentioned difficulties and to produce a simple and effective means which will insure the cutting off of the supply of current to the propelling-motors when the brakes are applied.

In one of its aspects my invention comprises one or more motors operatively connected to a load, a braking system therefor, a motor-controller, a controlling system for said motor-controller, a master-controller for said controlling system, and means, such as an automatically-actuated device, for rendering the controlling system inoperative when the brakes are applied. By such an arrangement I am enabled to employ a small, simple, and inexpensive device for controlling the automatic opening of the motor-circuit at the motor-controller or elsewhere when the brakes are applied, since said device will not have to handle directly the relatively heavy currents flowing in the motor-circuits. This safety device is preferably arranged to operate only upon an emergency application of the brakes and not to operate during normal operation or service application of the brakes.

In another aspect my invention comprises an electrically-propelled vehicle, a controlling system for the motors, a braking system, and means for automatically rendering said controlling system inoperative to insure the cutting off of the supply of current to the motors when the brakes are applied and for automatically reëstablishing said controlling system before the brakes are released.

More specifically considered, my invention consists of means, such as a pneumatically-actuated relay operatively connected to the train-pipe of an air-brake system and arranged as above described, to control the supply of power to the operating means for the motor-controller in a system of control employing master and motor controllers.

In the electrical system of train control herein illustrated and described employing motor-controllers of the separately-actuated contact type and master-controllers located at any desired points on the train I propose to use on each motor-car a safety device, such as a pneumatically-actuated relay connected to the train-pipe the maximum pressure in which is, say, seventy pounds and having its contacts connected in the control system—that is, the circuit connecting the master-controllers with the operating-coils for the motor-controller contacts. The device is set to open the control-circuit when the pressure in the train-pipe of the automatic air-brake system employed therewith is reduced to a certain predetermined value—say forty pounds pressure—and to reëstablish said circuit when the pressure rises to the same or another predetermined value—say forty-five pounds pressure. The effect of such an arrangement, as will be hereinafter explained, is that in the ordinary operation of the brake system the device is inoperative; but if an emergency application of the brakes is made and the train-pipe pressure is reduced to the pressure at which the device is set to operate the control-circuit is interrupted, and this occurs whether a reduction of pressure is made by means of the motorman's valve, the conductor's valve, or by the bursting of a hose or coupling. The brakes are not released until the pressure in the train-pipe is brought above the pressure at which the auxiliary reservoir and the brake-cylinder equalize—that is to say, at approximately fifty pounds—and before this pressure is reached the control-circuit is reëstablished.

The accompanying drawing illustrates diagrammatically the equipment of a single car of an electrical system of train control which is operated in conjunction with an automatic air-brake system.

The said drawing represents the preferred embodiment of my invention; but it will of course be understood that my improved safety device is equally applicable to systems of motor control operated and controlled other than electrically.

Referring now to the figure of the drawing, C represents a motor-controller of the separately-actuated contact type adapted to control the connections of the motors M' and M² and to regulate the supply of current from the trolley or collector-shoe T to said motors. One of these motor-controllers is located on each motor-car of the train and is adapted to be controlled from any one of the master-controllers C', located at any desired points on the car or train. Of the master-controllers illustrated in the figure the one at the left is illustrated in development, as is customary in representing constructions of this kind. The train-wires of the control system which connect the master-controllers with the several motor-controllers throughout the train are contained within the cable 5, having the couplers 5' at each end of the car. A more detailed description of the construction and operation of the motor-control system herein illustrated may be had from the patent to Perry, No. 687,060, granted November 19, 1901.

The source of compressed-fluid supply, herein shown as a motor-driven air-compressor, is illustrated at 6. The main reservoir of the air-brake system is indicated at 7. This reservoir connects directly with the engineer's valve 8, which controls the operation of the brake, being connected directly to the train-pipe 9. The brake-cylinder 10 is connected with the auxiliary reservoir 11 and with the train-pipe through the customary triple valve 12 of the automatic air-brake system.

Located in the control system, preferably in the connection leading from the trolley or other source of current-supply to the master-controlling device C', are the contacts 13, which are controlled by the pressure in the train-pipe 9 by means of the pneumatically-actuated safety device or relay 14. This safety device is preferably constructed so as to obtain a quick opening and closing movement of the contacts in such a manner as shown in the patent to Stewart, Jr., No. 671,244, granted April 2, 1901, but may be constructed and arranged in any desired manner and is illustrated here diagrammatically as composed of a single piston 15, operating against the action of the spring 16, which may or may not be made adjustable, as desired. The compressed fluid from the train-pipe enters the cylinder 17 of this safety device through the pipe 18. When the pressure rises in the train-pipe 9 sufficiently to overcome the pressure of the spring 16, the contacts 13 will be closed, and the motor-controller contacts may be operated by movement of the master-controlling device C'.

The air-brake system is normally operated at a pressure considerably above that at which the safety device is set to operate, and, as is well known, it requires but a relatively slight reduction of pressure in the train-pipe either by the operation of the engineer's valve or otherwise to cause the triple valve 12 to admit compressed fluid from the auxiliary reservoir 11 to the brake-cylinder to apply the brakes. Under ordinary conditions of running and during the service application of the brakes it is not considered necessary to open the motor-circuit every time the brakes are applied; but when the pressure in the train-pipe is reduced a considerable amount, as during the emergency application of the brakes, the supply of current to the motors should be cut off and the safety device should be so set that it will not operate to reëstablish the connection of the control system until the pressure in the train-pipe has risen to such a value that should it be necessary to make an immediate reapplication of the brakes after they are released the triple valve would be operated to cause the brakes to be applied. The said safety device should also be adjusted to complete the control-system connections before the pressure in the train-pipe has risen to such a value as to throw the triple valve to cause the brakes to be released.

Although I have shown and described my invention in connection with an automatic air-brake system in which the pressure in the train-pipe is reduced to cause the brakes to be applied, it will be understood that it is also applicable to a "straight" air-brake system or to other braking systems, and in the claims hereto appended I aim to cover all modifications which do not involve a departure from its spirit and scope.

What I claim as new, and desire to secure by Letters Patent of the United States, is—

1. In combination, one or more motors operatively connected to a load, a braking system therefor, a motor-controller, a controlling system for said motor-controller, a master-controller for said controlling system, and means for rendering the controlling system inoperative when the brakes are applied.

2. In combination, one or more motors operatively connected to a load, a braking system therefor, a motor-controller, a controlling system for said motor-controller, a master-controller for said controlling system, and means for rendering the controlling system inoperative when the brakes are applied and for reëstablishing said controlling system when the brakes are being released.

3. In an electrically-propelled vehicle, a motor-controller of the separately-actuated contact type, a master-controlling device therefor, a controlling system connecting the master-controlling device and the motor-controller, an air-brake system, and means for rendering said controlling system inoperative when the brakes are applied.

4. In an electrically-propelled vehicle, a motor-controller of the separately-actuated contact type, a master-controlling device therefor, a controlling system connecting the master-controlling device and the motor-controller, an air-brake system, and means for rendering said controlling system inoperative when the brakes are applied and for reëstablishing said controlling system when the brakes are being released.

5. In an electrically-propelled vehicle, a motor-circuit, a motor-controller of the separately-actuated contact type, a master-controller therefor, a controlling-circuit, an air-brake system, and a device operated when the brakes are applied for opening the controlling-circuit.

6. In an electrically-propelled vehicle, a motor-circuit, a motor-controller of the separately-actuated contact type, a master-controller therefor, a controlling-circuit, an air-brake system, and a device operated when the brakes are applied for opening the controlling-circuit and when the brakes are being released for closing said controlling-circuit.

7. In combination, one or more motors operatively connected to a load, a braking system therefor operated by compressed fluid, a motor-controller, a controlling system for said motor-controller, and an automatically-actuated device for rendering said controlling system inoperative when the pressure in the train-pipe of the braking system falls below a predetermined value.

8. In combination, one or more motors operatively connected to a load, a braking system therefor operated by compressed fluid, a motor-controller, a controlling system for said motor-controller, and an automatically-actuated device for rendering said controlling system inoperative when the pressure in the train-pipe of the braking system falls below a predetermined value and for reëstablishing said controlling system when the pressure in the train-pipe rises above a predetermined value.

9. In an electrically-propelled vehicle, a motor-circuit, a motor-controller, a master-controller, a controlling-circuit, an automatic air-brake system, and a pneumatically-operated relay connected to the train-pipe of the air-brake system and having its contacts in the controlling-circuit, the said relay being so constructed and arranged that it will open the controlling-circuit upon an emergency application of the brakes, but not upon a service application, and will close the controlling-circuit before the brakes are released.

10. In an electrically-propelled vehicle, a motor or motors, a controlling system therefor, a braking system, and means for automatically rendering said controlling system inoperative when the brakes are applied and for automatically reëstablishing said controlling system before the brakes are released.

11. In an electrically-propelled vehicle, a motor or motors, a controlling system therefor, an air-brake system, and a device for automatically rendering the controlling system inoperative so as to insure the cutting off of the supply of current from the motors when the brakes are applied and for reëstablishing said controlling system before the brakes are released.

12. In an electrically-propelled vehicle provided with a braking system, means operatively related to the braking system for insuring the cutting off of the supply of current to the propelling-motors when the brakes are applied, the said means being constructed and arranged to permit the motor-circuit to be reëstablished before the brakes are released.

13. In an electrically-propelled vehicle provided with a motor-controlling system and a braking system, manually-operated devices for controlling the operation of the motors and the brakes, and means operatively related to the braking system for causing the motor-circuit to be opened whenever the operator attempts to apply the brakes without returning the motor-controlling device to its "off" position, the said means being constructed and arranged to be returned to its normal position before the brakes are released.

14. In an electrically-propelled vehicle provided with a motor-controlling system and an air-brake system, manually-operated devices for controlling the operation of the motors and the brakes, and a pneumatically-operated device operatively connected to the said air-brake system and adjusted to cause the opening of the motor-circuit whenever the brake-controlling device is moved to give an emergency application without first moving the motor-controlling device to its "off" position, the said pneumatically-operated device being inoperative in the ordinary service application of the brakes.

15. In an electrically-propelled vehicle provided with a motor-controlling system and an air-brake system, manually-operated devices for controlling the operation of the motors and the brakes, and a pneumatically-operated device operatively connected to the said air-brake system and adjusted to cause the opening of the motor-circuit whenever the brake-controlling device is moved to give an emergency application without first moving the motor-controlling device to its "off" position and to reëstablish the motor-circuit before the brakes are released, the said device being also adjusted to remain inoperative during the ordinary service application of the brakes.

16. In an electrically-propelled vehicle provided with a motor-controlling system and a braking system, manually-operated devices for controlling the operation of the motors and the brakes, the latter being constructed and arranged to give a service application and an emergency application of the brakes, and an automatically-actuated device connected to the braking system and adjusted to cause the opening of the motor-circuit whenever the brake-controlling device is moved to give an emergency application without first moving the motor-controlling device to its "off" position, the said automatically-actuated device being inoperative in the ordinary service application of the brakes.

In witness whereof I have hereunto set my hand this 31st day of December, 1903.

FRED B. COREY.

Witnesses:
BENJAMIN B. HULL,
MARGARET E. WOOLLEY.